Nov. 5, 1968  E. P. WEBER ET AL  3,409,473
POROUS PLATE AND METHOD OF MAKING SAME
Filed Aug. 13, 1962  3 Sheets-Sheet 1
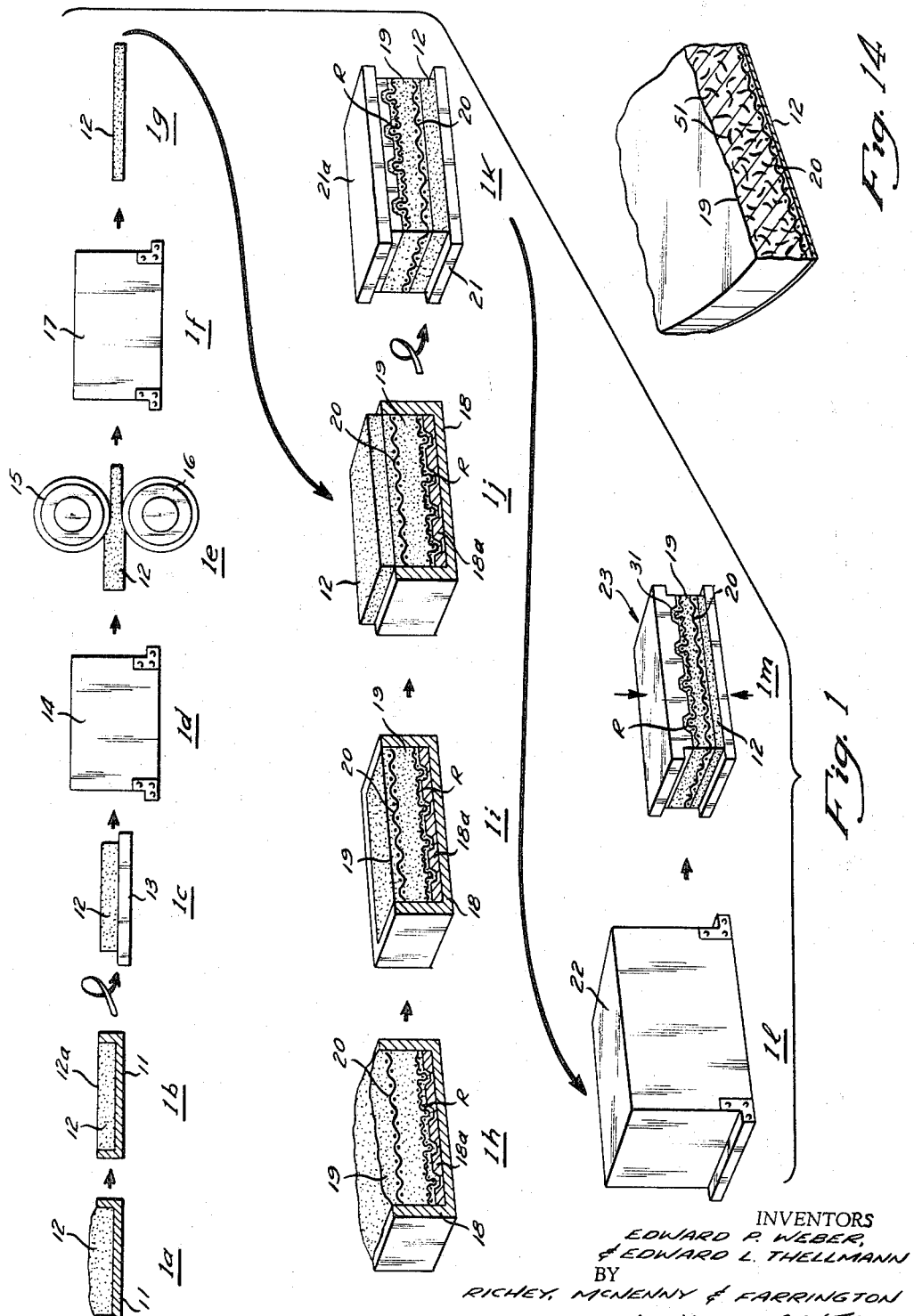
INVENTORS
EDWARD P. WEBER,
& EDWARD L. THELLMANN
BY
RICHEY, McNENNY & FARRINGTON
William J. Flynn
ATTORNEYS Nov. 5, 1968  E. P. WEBER ET AL  3,409,473
POROUS PLATE AND METHOD OF MAKING SAME
Filed Aug. 13, 1962  3 Sheets-Sheet 2
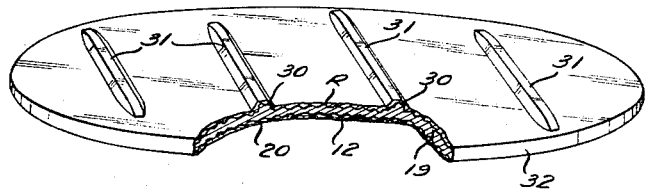
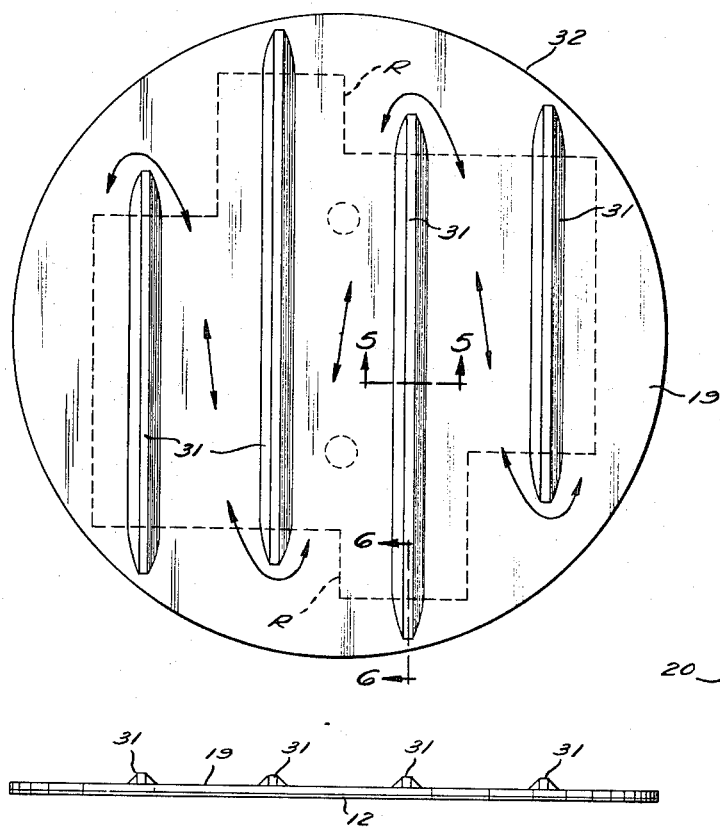
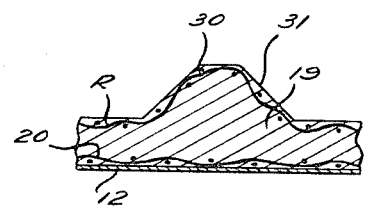
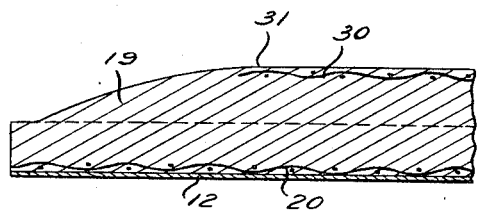
INVENTORS
EDWARD P. WEBER,
& EDWARD L. THELLMANN
BY
RICHEY, McNENNY, & FARRINGTON
William J. Flynn
ATTORNEYS Nov. 5, 1968  E. P. WEBER ET AL  3,409,473
POROUS PLATE AND METHOD OF MAKING SAME
Filed Aug. 13, 1962  3 Sheets-Sheet 3
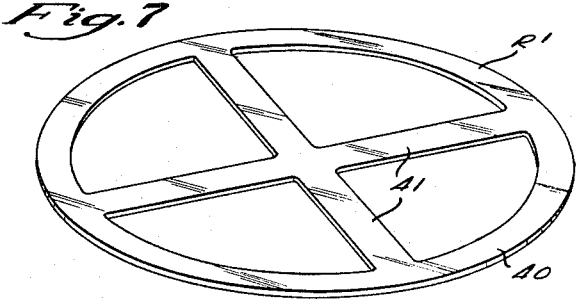
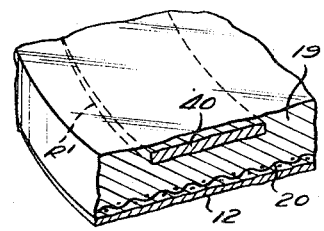
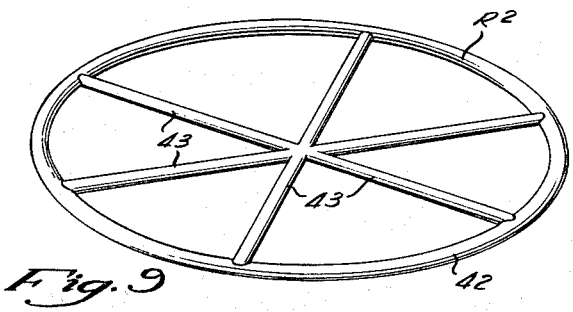
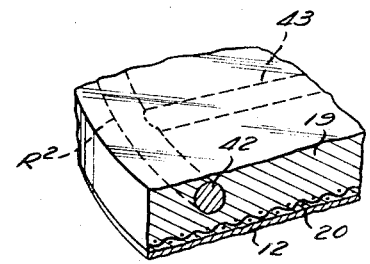
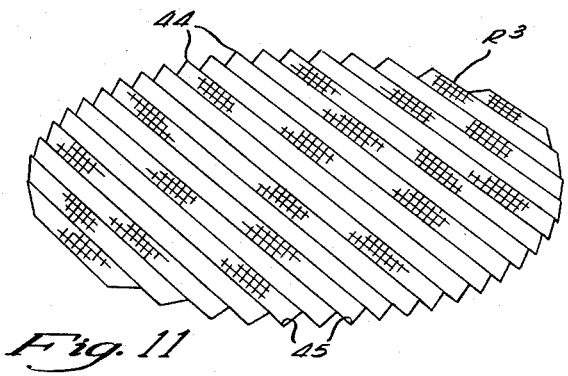
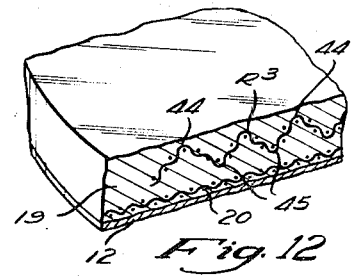
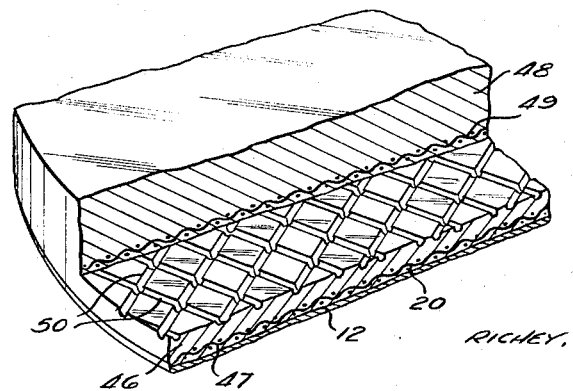
INVENTORS
EDWARD P. WEBER,
& EDWARD L. THELLMANN
BY
RICHEY, McNENNY & FARRINGTON
William J. Flynn
ATTORNEYS

United States Patent Office

3,409,473
Patented Nov. 5, 1968

3,409,473
POROUS PLATE AND METHOD OF MAKING SAME
Edward P. Weber, Parma, and Edward L. Thellmann, Walton Hills, Ohio, assignors to Clevite Corporation, a corporation of Ohio
Filed Aug. 13, 1962, Ser. No. 216,635
2 Claims. (Cl. 136—120)

This invention relates to a porous plate usable as a fuel cell electrode and to a method of making the same.

It has been proposed heretofore to provide dual porosity electrodes for fuel cells in which the fine porosity layer of the electrode is to be contacted by the fuel cell electrolyte. Prior to the present invention, such electrodes have not been entirely satisfactory from the standpoints of the rigidity and strength necessary to withstand the pressure differential existing on opposite sides of the electrode in the fuel cell. Also, prior electrodes of this general type have not been entirely adequate to withstand shock and vibration.

The present invention is directed to a novel porous plate, usable as a fuel cell electrode, which overcomes these difficulties and to a novel method of making such an improved porous plate.

It is an object of this invention to provide a novel and improved porous plate, usable as a fuel cell electrode.

It is also an object of this invention to provide such a plate having improved rigidity, strength, shock resistance and vibration resistance.

It is also an object of this invention to provide a novel method of making such an improved porous plate.

A particular aspect of this invention is directed to a novel porous plate, and to a method of making the same, having external ribs on its outer face which enable it to be attached to the ribs on a similar plate to provide a tortuous gas path between adjacent electrodes in a multiple fuel cell unit.

Further objects and advantages of this invention will be apparent from the following detailed description of certain presently-preferred embodiments thereof, shown in the accompanying drawings.

In the drawings:

FIGURE 1 shows schematically the steps involved in one embodiment of the method of making a multiple-layer porous plate in accordance with the present invention;

FIGURE 2 is a perspective view, with parts broken away for clarity, showing the novel porous plate produced by the method of FIGURE 1;

FIGURE 3 is a top plan view of the plate shown in FIGURE 2;

FIGURE 4 is a front elevational view of the same plate;

FIGURE 5 is an enlarged fragmentary section taken along the line 5—5 of FIGURE 3;

FIGURE 6 is an enlarged fragmentary section taken along the line 6—6 of FIGURE 3;

FIGURE 7 is a perspective view showing an alternative reinforcement member for use in the present porous plate;

FIGURE 8 is an enlarged fragmentary perspective section showing a multiple-layer porous plate in accordance with the present invention which incorporates the reinforcement of FIGURE 7;

FIGURE 9 is a perspective view showing a still further embodiment of the reinforcement member for use in the present porous plate;

FIGURE 10 is an enlarged fragmentary perspective section showing a multiple-layer porous plate in accordance with the present invention which incorporates the reinforcement of FIGURE 9;

FIGURE 11 is a perspective view showing a still further embodiment of the reinforcement member for use in the present porous plate;

FIGURE 12 is an enlarged fragmentary perspective section showing the present multiple-layer porous plate having the FIGURE 11 reinforcement member incorporated therein;

FIGURE 13 is an enlarged fragmentary section showing a still further embodiment of the present multiple-layer porous plate in which the reinforcement for the backing layer is provided by a grid pattern of metal deposited thereon; and FIGURE 14 is an enlarged perspective section showing the present multiple-layer porous plate with reinforcing fibers embedded in the backing layer.

Referring first to FIGURE 1, in accordance with the method shown therein, a mold 11 (position 1a) is filled with fine particles of the metal 12, such as nickel, which is to be used as the inner layer of the fuel cell electrode. After being filled, the mold 11 is vibrated so as to evenly distribute the metal particles 12. Then the excess particles disposed above the top of the mold are struck off (position 1b), so that the top surface 12a of the mass of the metal particles 12 is substantially flat and even with the top of the mold. Following this, the mold is turned upside down on a flat plate 13 (position 1c) and is then removed, leaving the loosely packed powder particles 12 in place on the plate 13. Then the plate 13 with the powdered particles thereon is inserted into a furnace 14 (position 1d) in which the metal particles are sintered. Following this, the sintered sheet 12 is removed from the furnace and is passed between opposed rolls 15 and 16 (position 1e), which compact the sintered sheet and reduce its thickness. The sintered and rolled sheet 12 is then inserted into another sintering furnace 17 (position 1f) for final flattening and clean-up.

A second mold 19 (position 1h) is filled with a mass of metal particles 19. In a preferred embodiment these particles 19 are substantially larger particle size than the particles 12 in the inner layer, although they may be of substantially the same size if a single porosity plate is desired. A reinforcement, such as a substantially flat reinforcing screen 20, is provided in this mass of particles, preferably close to the top of the mold 18. An additional stiffer reinforcing screen R (to be described in detail later) is also provided in this mass of particles at the bottom of the mold 18. The mold has a bottom piece 18a which conforms substantially to the shape of the reinforcing screen R. The mold 18 is vibrated to distribute the metal particles evenly and the excess metal particles above the top of the mold are struck off (position 1i).

Following this, the sintered and rolled sheet 12 from position 1g is placed on top of the mass of coarse metal particles 19 in the mold 18 (position 1j). Following this, the mold 18 is turned upside down on a supporting plate 21 (position 1k) and the mold is removed, leaving the sintered and rolled fine porosity sheet 12 on the bottom and the loosely packed coarse metal particles 19 on top. A top plate 21a is placed over the coarse particles 19 and the entire assembly is put into a sintering furnace 22 (position 1l) in which the coarse particles 19 become bonded to each other and to one major face of the previously sintered and rolled fine porosity sheet 12.

Following this, the two-layer sintered block is removed from the furnace 22 and is put in a press 23 (position 1m) which compacts it to its final form.

If desired, in the foregoing method the mold 18 may be replaced by a two-part mold in which the interconnected sides of the mold are separable from the bottom, as disclosed in FIGURE 3 of our co-pending application Ser. No. 216,640, filed concurrently herewith. If such a mold is provided the sides of the mold may be removed at position 1j and it will not be necessary to invert the assembly before putting it in the sintering furnace 22. In all other respects the method is unchanged from the method already described in detail hereinbefore.

As shown clearly in FIGURES 5 and 6, the substantially flat screen 20 preferably is substantially contiguous to the inner layer 12.

The other reinforcing screen R, which is one practical embodiment may be made of 16 mesh nickel, is substantially stiffer than the screen 20 and is generally flat, but at a plurality of spaced locations thereon is formed with integral raised corrugations or ribs 30 which project away from the inner layer 12. In the particular embodiment shown, there are four such ribs in the reinforcing screen R, these ribs extending substantially parallel to one another and being substantially equally spaced. However, it is to be understood that the number, location and direction of these ribs may be varied, as desired.

The reinforcing screen R has an irregular outline, as shown in dashed lines in FIGURE 3, such that it extends over the major portion of the area of the backing layer 19 in which it is embedded.

The metal particles of the backing layer 19 provide a thin cover of substantially uniform thickness over the reinforcing screen R, so that the major face of the layer 19 which is remote from the inner layer 12 is formed with four raised ribs 31, which conform substantially to the shape of the ribs 30 in the reinforcing screen R. The top plate of the press 23 in FIGURE 1 is shaped to conform substantially complementarily to the ribs 30 on the reinforcing screen R so as to impart this configuration to the outer face of the finished multiple-porosity plate.

In one particular embodiment under discussion, the inner layer 12 had a thickness of .006 inch and the coarse pore backing layer 19 had a maximum thickness (at ribs 31) of .154 inch and between the ribs had a thickness of substantially .069 inch. The sides of each rib 30 on the reinforcing screen extended at substantially 45° to the major plane of this screen. The crest of each rib 31 on the outer layer of the plate had a width of substantially $\frac{1}{16}$ inch in this particular embodiment. The ribs were spaced apart from each other substantially one inch from center to center.

The finished two-layer plate constructed according to the foregoing description has a high mechanical strength and has sufficient rigidity to withstand deflection or deformation perpendicular to its major faces when subjected to the pressure differential existing in a fuel cell. It has the further advantage that the ribs 31 provide spacers for separating the electrode from a similar adjacent electrode in a multiple fuel cell arrangement. Neighboring electrodes of this type may be brazed to one another at the ribs 31. This is highly desirable in certain fuel cell constructions employing a plurality of pairs of electrodes and where it is desired to provide a tortuous path for gas flowing between the neighboring electrodes. It will be apparent from FIGURE 3 that the particular rib construction shown therein provides such a tortuous path (shown by the arrows) since every other rib 31 extends from one edge of the margin 32 only part way across the face of the electrode, and the remaining ribs 31 extend from the opposite edge of the margin 32 only part way across the face of the electrode.

FIGURE 7 shows a reinforcement member $R^1$ which may be used in place of the reinforcing screen R in the present multiple-layer porous plate. This particular reinforcement is a wrought stamping of suitable metal, providing a flat circular rim 40 and a plurality of flat, intersecting, radial arms 41 extending inwardly from the rim 40 in substantially the same plane and intersecting each other at the center of the reinforcement $R^1$. This stamping presents a plurality of large area openings between its arms 41.

FIGURE 8 shows a fragmentary sectional perspective of a multiple-layer porous plate which incorporates the reinforcement $R^1$. The method of making this plate is substantially the same as the method described with respect to FIGURE 1, except that the reinforcement $R^1$ is substituted for the reinforcing screen R and the outer face of the backing layer 19 is made flat.

FIGURE 9 shows a still further reinforcement member $R^2$ for use in the present multiple-layer porous plate. This reinforcement is a metal wire spider constituted by a substantially planar circular rim 42 and a plurality of radial arms 43 extending inward from the rim 42 in the same plane and intersecting each other at the middle. The spider has a plurality of large area openings between its arms 43.

FIGURE 10 shows a fragmentary sectional perspective of a multiple-layer porous plate which incorporates the reinforcement $R^2$. The method of making this plate is substantially the same as the method described with reference to FIGURE 1, except that the reinforcement $R^2$ is substituted for the reinforcing screen R and the outer face of the backing layer 19 is made flat.

FIGURE 11 shows a still further reinforcement $R^3$ for use in the present multiple-layer porous plate. This reinforcement is constituted by a substantially rigid, heavy wire screen of corrugated configuration shaped to provide alternate peaks 44 and valleys 45 which are substantially evenly spaced from one another.

FIGURE 12 shows a fragmentary sectional perspective of a multiple-layer porous plate which incorporates the reinforcement $R^3$. The method of making this plate is substantially the same as the method described with reference to FIGURE 1, except that the screen $R^3$ is substituted in place of the screen R and the outer face of the backing layer is flat.

FIGURE 13 shows a still further embodiment of the present invention which comprises a fine porosity, thin metal powder layer 12, a metal powder middle layer 46, preferably of coarse porosity having a flat reinforcing screen 47 embedded therein in close proximity to its interface with the fine porosity layer 12, and an outer layer 48, also preferably of coarse porosity, having a flat reinforcing screen 49 embedded therein in close proximity to its interface with the middle layer 46. In accordance with this embodiment of the present invention, at its outer face (remote from the fine porosity inner layer 12), the middle layer 46 is provided with a stiffening reinforcement in the form of a grid-like pattern 50 of metal which is deposited on the middle layer by electroplating or any other suitable metalizing technique.

In the manufacture of the FIGURE 13 plate, the two layers 12 and 46 are formed and bonded together substantially in accordance with the method described with reference to FIGURE 1. Then, the grid-like reinforcement 50 is deposited on the outer face of the backing layer 46. Following this the two-layer piece 12, 46 is bonded to a mass of powder, which makes up the outer layer 48, substantially as shown in the steps depicted in positions $1h$–$1m$ in FIGURE 1. The porosity and pore size of this outer layer 48 should be at least as great as those of the backing layer 46.

FIGURE 14 shows in fragmentary sectional perspective a still further embodiment of the present multiple-layer porous plate. In this embodiment the backing layer 19, which preferably is of coarse porosity, is reinforced by having embedded therein a plurality of randomly disposed short fibers 51 of a material having a substantially higher modulus of elasticity than the nickel or other metal powder which makes up the inner layer 12 and the bulk of the backing layer 19. Such fibers may be of wrought metal or glass, for example.

In the manufacture of this plate, the fibers 51 are blended in with the powder 19 when the mold 18 (FIGURE 1) is filled. All the other steps of the process correspond substantially to the showing in FIGURE 1.

In each of the foregoing embodiments, as a specific example, the fine porosity inner layer 12 may be of nickel powder and has a thickness of .006 inch, with over 90% of its pores less than 3 microns in diameter, with the pore peak (i.e., the greatest number of pores) at about 2 microns, and with an overall porosity of about 43%. In this same example, the coarse porosity backing layer 19 (FIGURES 1–12 and 14) or 46 (FIGURE 13) throughout its extent has a thickness several times that of the inner layer 12, an overall porosity of about 70%, with over 80% of its pores within the range from 3 to 12 microns in diameter, and with a pore peak at about 7 microns.

While certain presently-preferred embodiments of this invention have been described in detail herein and shown in the accompanying drawings, it is to be understood that various modifications, omissions and refinements which depart from the disclosed embodiments may be adopted without departing from the spirit and scope of this invention. For example, the reinforcing member R in FIGURE 1, instead of being a screen, may be made of a thin metal stamping or of expanded metal. Also, any of the other reinforcing screens 20 (FIGS. 2, 8, 10, 12 and 14) or 47 and 49 (FIG. 13) may be replaced by a flat sheet of expanded metal for increased strength, if desired. Also, in each embodiment the layers of the porous plate may be of substantially the same porosity, if desired.

What is claimed is:

1. A method of making a multiple-layer porous plate usable as a fuel cell electrode comprising the steps of sintering a thin metal powder inner layer, providing a substantially thicker mass of metal powder and embedding in said mass a stiff reinforcing screen presenting a plurality of ribs projecting in one direction, and sintering said mass of metal powder with said screen embedded therein to one major face of said inner layer and forming external ribs on the face of said powder mass which follow the conformation of said screen ribs.

2. A method of making a multiple-layer porous plate usable as a fuel cell electrode comprising the steps of sintering to each other a thin metal powder inner layer and a substantially thicker metal powder backing layer, depositing metallized regions on the outer face of said backing layer, and sintering an additional metal powder layer to said outer face of the backing layer.

References Cited

UNITED STATES PATENTS

| | | | |
|---|---|---|---|
| 2,361,378 | 8/1944 | Brennan | 204—292 |
| 3,101,285 | 8/1963 | Tantram et al. | 136—120 |
| 1,988,861 | 1/1935 | Thorausch et al. | 136—29 |
| 2,681,375 | 6/1954 | Vogt | 136—20 |
| 2,776,331 | 1/1957 | Chapman | 136—75 |
| 2,832,813 | 4/1958 | Peters | 136—34 |
| 2,914,596 | 11/1959 | Gorin et al. | 136—120 |
| 3,053,925 | 9/1962 | Donohue | 136—21 |

FOREIGN PATENTS

| | | |
|---|---|---|
| 871,950 | 7/1961 | Great Britain. |
| 477,973 | 10/1951 | Canada. |

HOWARD S. WILLIAMS, *Primary Examiner.*

W. VAN SISE, *Assistant Examiner.*